United States Patent [19]

Hellmer et al.

[11] 3,869,237

[45] Mar. 4, 1975

[54] MOLD ASSEMBLY

[75] Inventors: Ernest W. Hellmer, Chicago; John P. Kinsley, Hanover Park, both of Ill.

[73] Assignee: Continental Can Company, New York, N.Y.

[22] Filed: Dec. 20, 1972

[21] Appl. No.: 316,926

[52] U.S. Cl. .......... 425/292, 425/302 B, 425/305 B, 83/914, 425/326 B
[51] Int. Cl. ....................... B28b 7/14, B28b 11/12
[58] Field of Search ............ 425/292, 302 B, 305 B, 425/DIG. 212; 83/914, 326 B, 292

[56] References Cited
UNITED STATES PATENTS
3,224,038  12/1965  Budesheim ........................ 425/292

*Primary Examiner*—Willie G. Abercrombie
*Attorney, Agent, or Firm*—Diller, Brown Ramik & Wight

[57] ABSTRACT

This disclosure relates to a molding machine for molding hollow articles, such as bottles, which are provided with an opening therein. The molds of the machine are modified so that each has incorporated therein a cutter which is operable after a member has been blown therein to cut off the parison material at one end and to form the desired opening in the member. The cutter is automatically actuated by means of a cam as the mold passes a predetermined position in its path of travel. Further, the cam is resiliently mounted so as to absorb shock and to prevent jamming of the mold structure in the event of blockage of the actuation of the cutter. The resiliently mounted cam has associated therewith switch means for shutting down the machine upon predetermined excessive movement of the cam.

24 Claims, 14 Drawing Figures

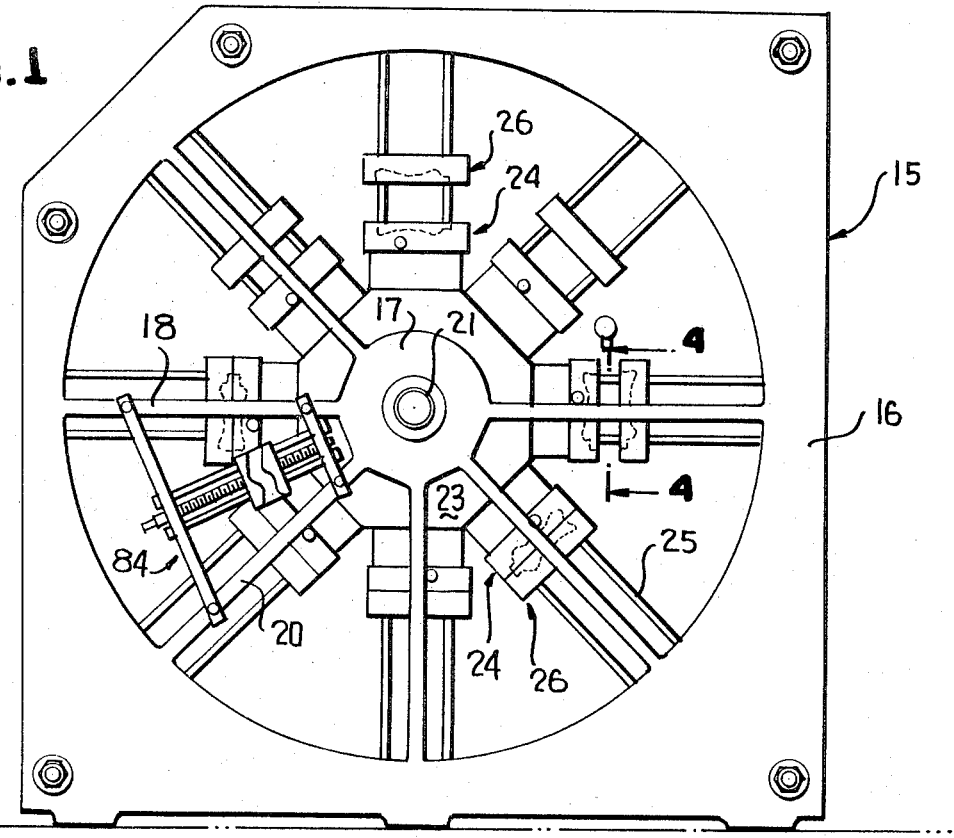
FIG. 1
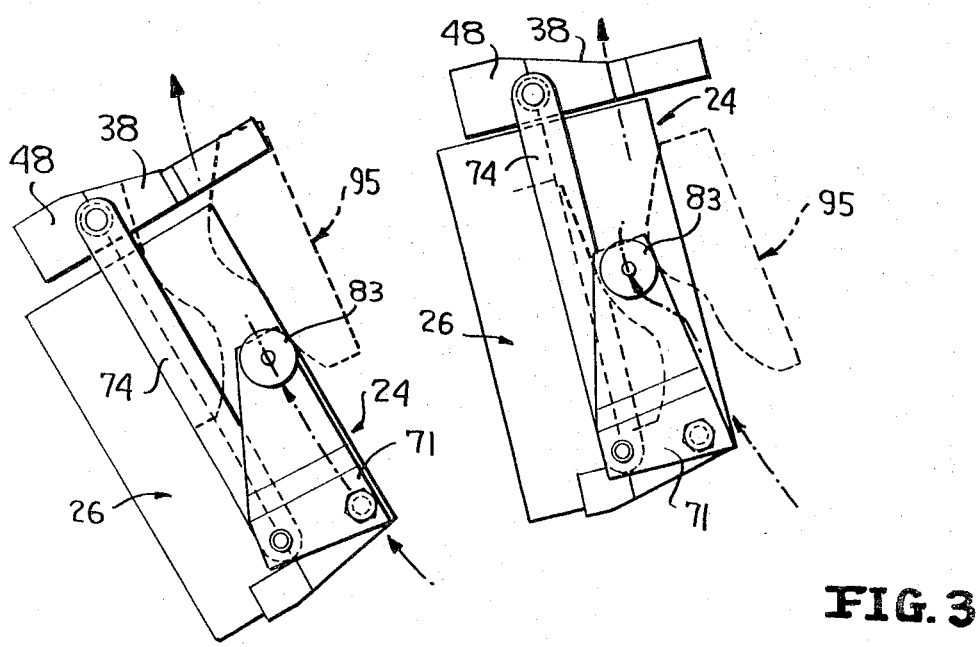
FIG. 2
FIG. 3

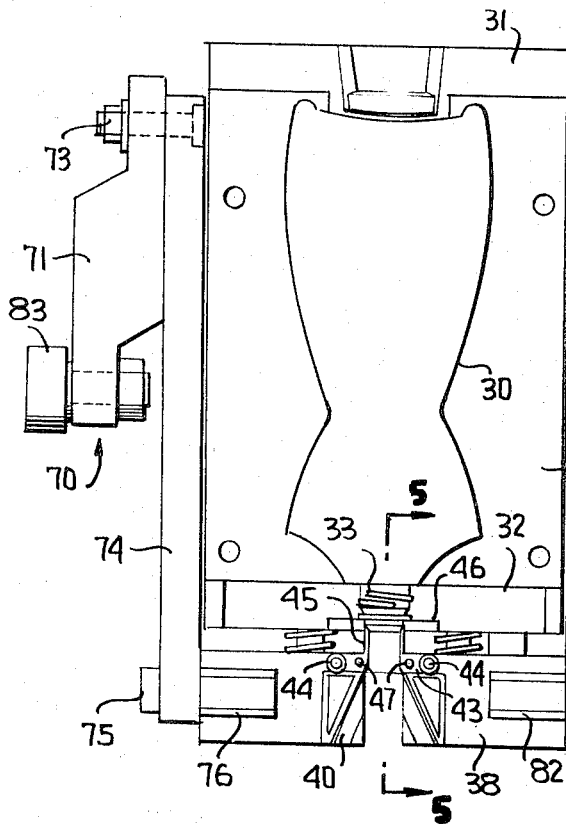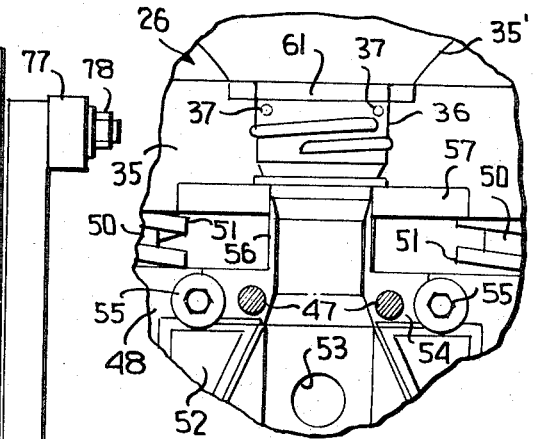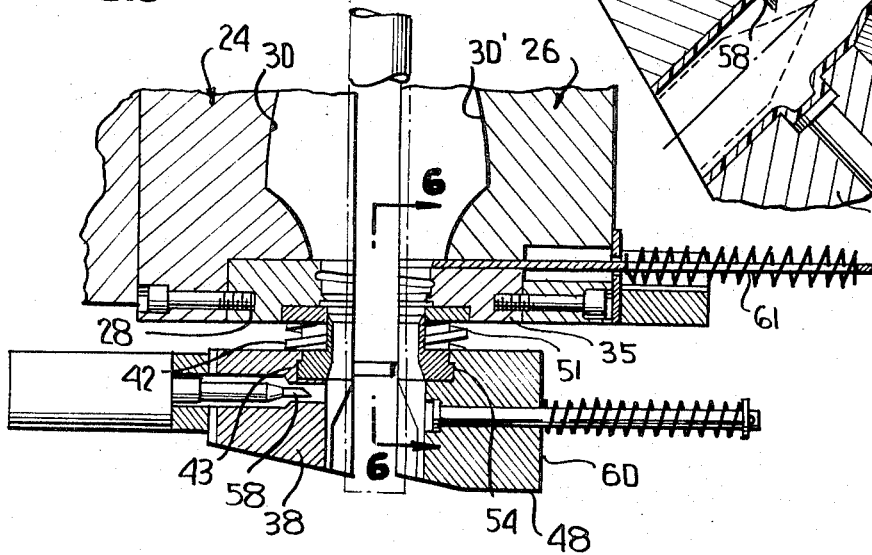

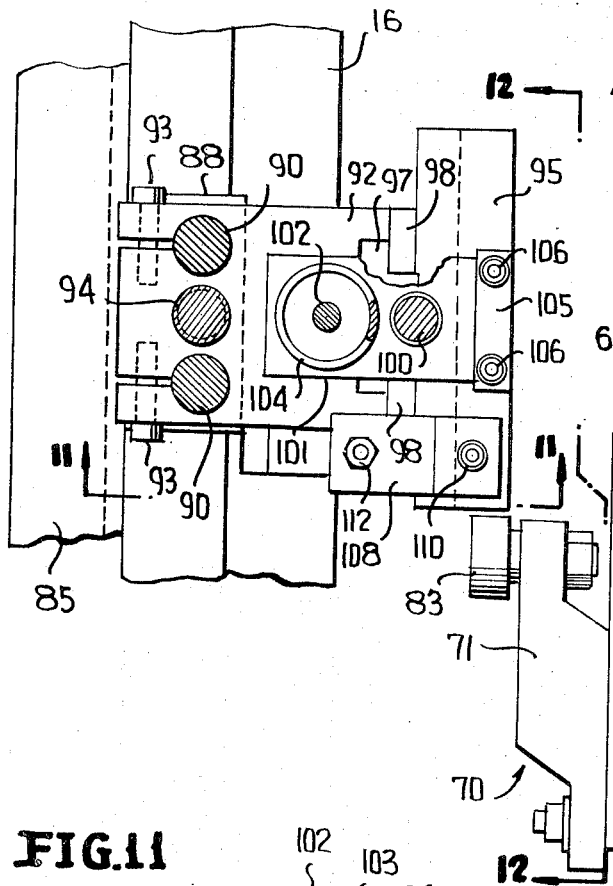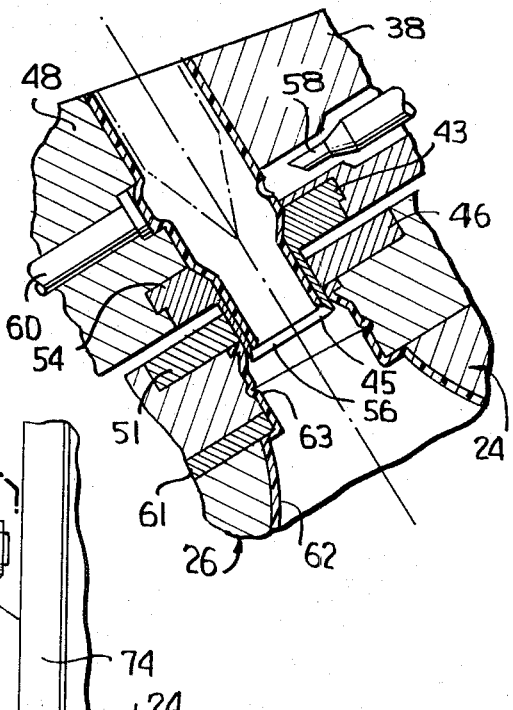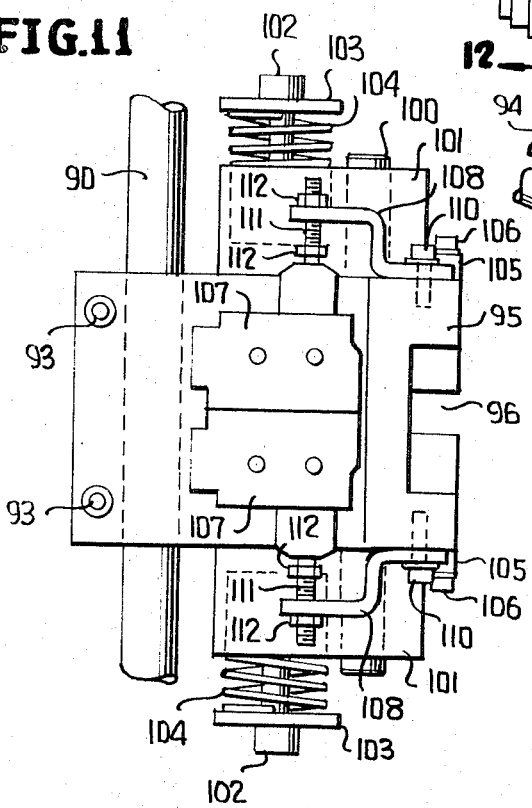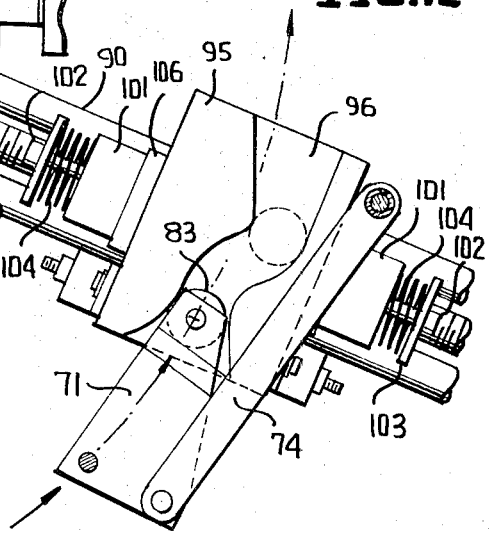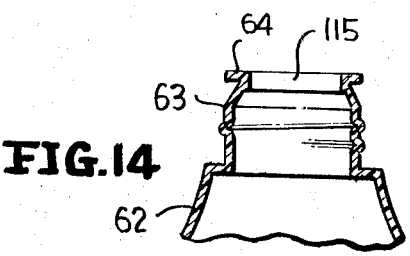

MOLD ASSEMBLY

This invention relates in general to new and useful improvements in molding machines, and more particularly to a molding machine for forming hollow articles by blow molding process utilizing an extruded tube.

BACKGROUND OF THE INVENTION

Hollow members in general, and containers and bottles in particular, are conventionally formed in a molding machine which has a plurality of molds mounted for movement along a predetermined path with each mold having received therein a length of extruded tubing and the mold pinching off the tubing at the opposite ends of a mold cavity and sealing the same. Thereafter, a needle is injected into a portion of the tubing which will not become part of the hollow member and air under pressure is injected into the sealed tube so as to effect a blowing thereof within the mold cavity.

The pinch off of the tube material at the bottom of the member, such as a bottle, is such that a very weak connecting line exists between the member bottom and the pinched together tube material. On the other hand, the opposite end of the usual member, particularly in the case of a bottle, includes a tubular extension through which the blow needle was pierced. As a result, the pinched material of the tube is solidly connected with the member and is not readily removable therefrom. In the case of a bottle where the tube is an extension of the bottle neck, it is necessary to perform several operations after the bottle has been molded. First, it is necessary to cut off the tubular extension adjacent the desired free end of the bottle neck. Then it is necessary to end ream the bottle neck so as to be of the desired height. Further, the bottle neck should be internally reamed. The foregoing requires a minimum of two operations and normally three. Further, it involves small pieces of scrap, including chips resulting from the reaming operation.

SUMMARY OF THE INVENTION

In accordance with this invention, it is proposed to modify the operation of a molding machine so that the necessary cut off of the pinched off tube material is effected automatically within the mold.

In accordance with this invention, the necessary tube cut off is accomplished by molding the hollow member in the area where the tube portion of the waste material joins the member with a transverse shoulder and thereafter severing that shoulder by means of an axially movable cutter.

In accordance with the invention, the cutter is of a split tubular construction with the two halves of the cutter opening to receive the tube therebetween. Then when the shoulder is blow molded on the molded member, and after the material has had an opportunity to slightly cure within the mold, the tubular cutter is moved axially of the tube and severs the connection between the tube and the molded member along the transverse shoulder.

The required movement of the cutter is effected by mounting the cutter in a separate mounting member which is in the form of two blocks each secured to a respective mold half and being openable and closeable in unison with the respective mold half. One of the blocks carries the necessary blow needle. As the mold comes together around the extruded tube, the cutter forms part of the mold cavity above the article to be molded. Thereafter, the separate support blocks are moved axially towards the mold halves and the resultant relative movement between the cutter and the blown member results in the desired severing action. The cutter is returned to its original position by resilient means reacting against the separate mounting blocks and when the mold opens, the severed tube portion is ejected from the mold separate and apart from the molded member. No further trimming operation is required in that the cutter is accurately positioned with respect to the molded member at the time of cutting action.

Inasmuch as the tube portion has been severed from the molded member at one end thereof, it is necessary to provide an interlock between the molded member and the mold half in which the molded member is normally retained when the mold opens. This is accomplished by providing minute projections in the mold cavity which interlock with the molded member.

Another feature of the invention is the provision of a cam actuated linkage for effecting the automatic operation of the cutter as it passes a predetermined point in the path of movement of the mold.

A further feature of the invention is the provision of a readily adjustable cam which may be accurately positioned for effecting the operation of the cutter. Means are provided for resiliently mounting the cam so as to be shock absorbent and at the same time to prevent damage to the mold in the event of jamming of the cutter. Switch means are also associated with the cam so that in the event there is excessive movement of the cam, operation of the machine will be automatically shut down so as to minimize damage.

Another feature of the invention is a novel bottle neck finish wherein the interior of the bottle neck at the extreme end thereof is axially inwardly molded through the operation of the cutter while the plastic material of the bottle is not fully set.

With the above and other objects in view that will hereinafter appear, the nature of the invention will be more clearly understood by reference to the following detailed description, the appended claims and the several views illustrated in the accompanying drawings

IN THE DRAWINGS:

FIG. 1 is a schematic elevational view of a molding machine incorporating the invention.

FIG. 2 is a schematic elevational view showing the operational linkage for the cutter.

FIG. 3 is a view similar to FIG. 2 and shows the linkage in a position wherein the cutter is operative.

FIG. 4 is a fragmentary sectional view taken generally along the line 4—4 of FIG. 1 and shows the details of the inner half of a typical mold.

FIG. 5 is a fragmentary axial view through the mold halves along the line 5—5 of FIG. 4 and shows the mold halves in a nearly closed position.

FIG. 6 is a fragmentary axial view taken along the line 6—6 of FIG. 5 and shows the details of the outer mold half.

FIG. 7 is a fragmentary sectional view similar to FIG. 6 with the mold closed and the bottle blown therein.

FIG. 10 is a fragmentary generally circumferential view taken along the line 10—10 of FIG. 8 and shows further the details of the cam.

FIG. 11 is a radial view taken generally along the line 11—11 of FIG. 10 and shows further the details of the cam and switches actuatable thereby.

FIG. 12 is a fragmentary vertical sectional view taken generally along the line 12—12 of FIG. 10 and shows the relationship of a mold linkage with respect to the cam.

FIG. 13 is a fragmentary sectional view taken through the bottle similar to FIG. 7 and shows the cutter in its operative position.

FIG. 14 is a fragmentary sectional view taken through the neck portion of the bottle molded and severed in accordance with this invention.

Figure 8:
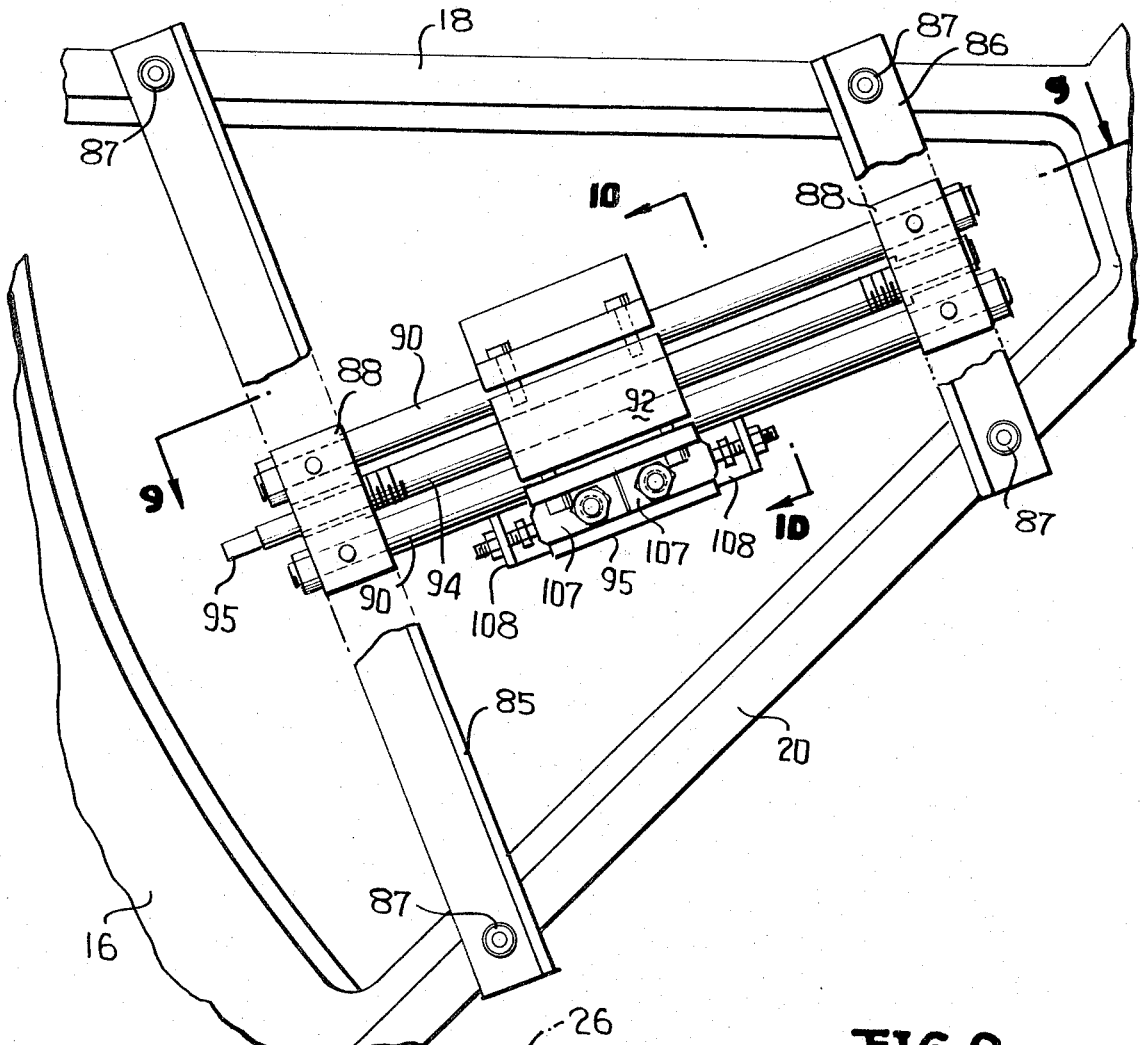
FIG. 8 is an enlarged fragmentary elevational view of the frame of the machine of FIG. 1 and shows the details of the cam for actuating the cutter.

Referring now to the drawings in detail, it will be seen that there has been diagrammatically illustrated in FIG. 1 the molding machine of this invention, the molding machine being generally identified by the numeral 15. The molding machine itself is basically of a conventional construction and includes a frame 16 having at one side thereof a plurality of spokes supporting a central hub 17, the spokes including spokes 18 and 20.

The central hub 17, which is disposed on opposite sides of the machine, supports a main shaft 21 on which a wheel-like structure 22 is mounted for rotation. The wheel-like structure 22 includes an inner member 23 on which a plurality of inner mold halves 24 are substantially fixedly mounted. The wheel 22 also includes a plurality of guide structures 25, each aligned with an inner mold half 24 and carrying for radial opening and closing movement an outer mold half 26, the mold halves 24 and 26 being arranged in complementary pairs.

It is further to be understood that suitable cam means (not shown) carried by the frame 16 cooperate with the outer mold halves 26 to effect an automatic opening and closing movement thereof as the wheel structure 26 rotates. In addition, the molding machine includes a conventional extruder nozzle 27 which is adapted to continuously extrude a hollow plastic tube. At this time it is pointed out that the molding machine 15 is an improved version of the basic type of molding machine disclosed more fully in the patent to Herbert S. Ruekberg et al., Pat. No. 3,025,561, granted Mar. 20, 1962. However, the molding machine 15 is provided with an improved mold structure which is a principal feature of this invention.

Referring now to FIG. 4 in particular, it will be seen that there is illustrated the general details of one of the inner mold halves 24 which includes a mold member 28 having the desired cavity 30 formed therein, the illustrated cavity being for a bottle. At one end of the mold member 28, there is a removable pinch off member 31 and at the opposite end of the mold member 28 there is a replaceable neck finish member 32 having a cavity portion 33 of a configuration to define a bottle neck having external threads.

Normally the mold member 28 would have directly secured thereto a further pinch off member. However, in accordance with this invention, the further pinch off member is separate from the mold member 28, as will be described hereinafter.

As is shown in FIGS. 5 and 6, the outer mold half 26 also includes a mold member 34 having a cavity 30' defined therein which is complementary to the cavity 30. The mold member at one end thereof will be provided with a pinch-off member (not shown) similar to the pinch-off member 31. At the opposite ends thereof, the mold member 34 is provided with a neck finish member 35 having a neck finish defining cavity 36 therein. At this time it is pointed out that the neck finish member 35 is provided with two small pins 37 which project into the cavity 36 adjacent the face surface of the neck finish member 35. The purpose of the pins 37 will be described hereinafter.

Returning once again to FIG. 4, it will be seen that the mold half 24 has secured to that end thereof on which the neck finish member 32 is mounted, a separate block 38 having a tube pinch off cavity 40 formed therein. The block 38 is mounted on the mold member 28 by means of a pair of bolts 41 having telescoped thereover springs 42 with the springs 42 urging block 38 away from the mold member 28 and the bolt 41 limiting the movement.

The block 38 carries a cutter half 43 which is retained in place by fasteners 44. The cutter half 43 includes a semi-cylindrical knife member 45 which projects beyond the block 38 towards the mold member 28 and is received within a guide member 46 inset in the neck finish member 32.

The cutter half 43 also carries a pair of projecting guide pins 47 which are spring urged outwardly and which are fully retractable within the cutter half 43. The guide pins 47 are adapted to have received therebetween the extruded tube and serves to assure alignment of the tube with the neck cavity 33 and the cutter half 43.

Referring now to FIG. 6, it will be seen that the mold member 34 also has secured thereto in spaced relation a separate block 48. The block 48 is secured to the mold member 34 by bolts 50 having springs 51 telescoped thereover. It is to be understood that the block 48 is complementary with the block 38 and has a pinch-off portion 52 formed therein. The pinch-off portion 52 differs from the pinch-off portion 40 only in that it includes an additional cavity 53 to affect an interlock between the pinched off tube portion and the block 48 for a purpose to be described hereinafter.

The block 48 has removably mounted therein a second cutter half 54 which is secured in place by fasteners 55. The cutter half 54 also includes a semicylindrical knife member 56 which is complementary to the knife member 45. The knife member 56 projects from the block 48 towards the mold member 34 and is guidingly received within a guide plate 57 carried by the neck finish member 35. At this time it is pointed out that the guide pins 47 abut against the cutter half 54 as the mold halves 24, 26 come together.

Reference is now made to FIG. 5 wherein further details of the mold halves 24, 26 are found. In order that the hollow plastic tube which is pinched off between the mold halves 24, 26 may be blow molded within the cavity halves 30, 35, the block 38 is provided with a conventional blow needle 58. Also, the block 48 is provided with a knock-out rod 60 which is aligned with the cavity 53. In addition, the mold member 34 is provided with a further knock-out member 61 which is generally aligned with the neck cavity 36 and forms a portion thereof.

Referring now to FIG. 7, it will be seen that the knife halves 45, 56 cooperate to form an extension of the mold cavity defined by the cavities 30, 35. When a plastic tube is blow molded within the mold into a bottle 62, the bottle 62 will have a neck finish 63 which terminates in a molded end surface 64 to which there is integrally connected in offset relation a tube portion 65. The tube portion 65 extends through the cooperating knife halves 45, 56 into the pinch off cavities 40, 52 of the blocks 38, 48, respectively.

After the blow molding of the bottle 62 has been completed and before the mold halves 24, 26 are opened, the blocks 38, 48 are moved in unison axially of the mold towards the mold halves 24, 26 with the result that the knife halves 45, 56 sever the two portions 65 from the neck finish 63, as is clearly shown in FIG. 13.

It will be readily apparent that in a simple cutting operation the excess tube material which normally must be cut off from the neck finish of the bottle in a separate operation is severed. Further, the severing operation is one which is accurate and thus eliminates the further endmilling and reaming of the neck of the bottle. end milling the mold assembly eliminates a further machine and at least two finishing operations on the bottle.

Reference is now made to FIGS. 2, 3 and 4 wherein linkage, generally identified by the numeral 70 is provided for moving the blocks 38, 48 axially towards the mold halves 24, 26 to effect the afore-described cutting operation. The linkage includes an actuator link 71 which is secured on a shaft 72 in interlocked relation therewith. The shaft 72 passes through the mold member 28 and is suitably journalled therein for rotation. The link 71 has pivotally connected thereto by means of a pivot member 73 an elongated link 74. The link 74 carries a pin 75 which is journalled in a sleeve member 76 seated in a suitable cavity formed in the block 38. As will be apparent from FIG. 2, the sleeve 76 projects from the face of the block 38 and is partially received in a similar cavity in the block 48.

The linkage 70 also includes a link 77 carried by the shaft 72 on the opposite side of the mold member 28 and interlocked with the shaft 72 for swinging therewith. The link 77 is connected by means of a pivot 78 to an elongated link 80 which extends alongside the mold member 28 and corresponds to the link 74. The link 80 is connected by means of a pin 81 to the block 38 through a sleeve 82 which corresponds to the sleeve 76 and is seated in a semi-cylindrical cavity formed in the block 38. The block 48 is provided with a similar cavity (not shown).

Figure 9:
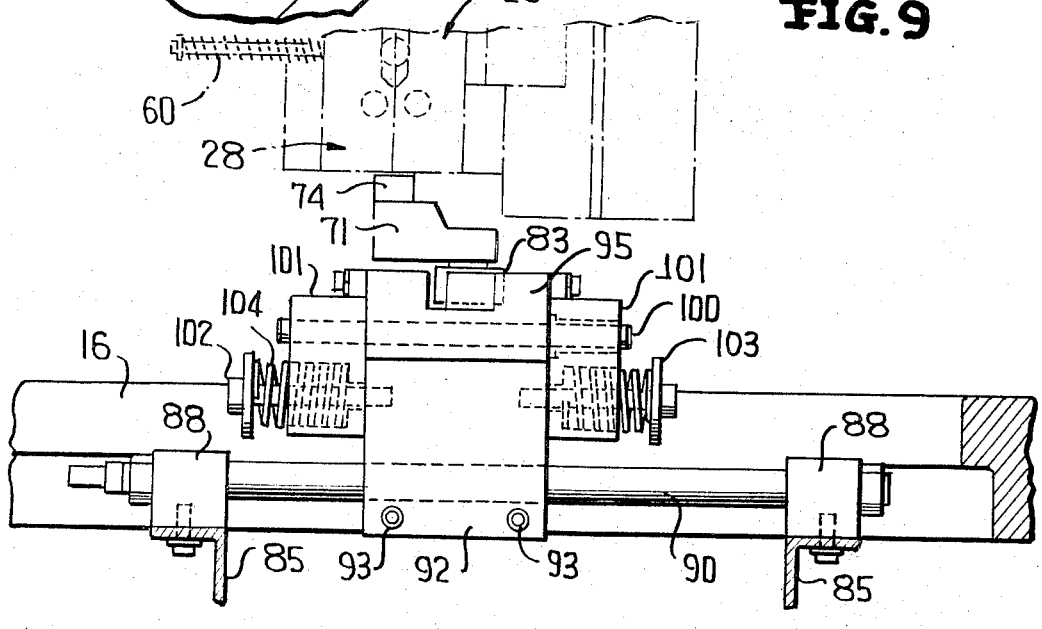
FIG. 9 is a radial sectional view taken along the line 9—9 of FIG. 8 and shows generally the details of the cam and the relationship thereof with respect to a mold.

It is to be understood that when the mold half 26 is moved radially inwardly and is in cooperating relation with respect to the mold half 24, the sleeves 76, 82 are clamped between the blocks 38, 48 and serve to positively connect the blocks 38, 48 to the links 74, 80. When the link 71 is pivoted in a counterclockwise direction, as shown in FIG. 3, the links 74, 80 will be moved substantially axially of the mold halves 24, 26 and the blocks 38, 48 will move towards the mold halves and effect the operation of the cutter in the manner illustrated in FIG. 13. The movement of the links 71 may be accomplished in any desired manner. However, in the preferred embodiment of the invention, the link 71 is provided with a cam follower 83 which is engaged with a cam carried by the frame 16. The cam, of course, maybe a stationary type of cam. However, in order to preclude any damage to the cutter or the mold in the event of a jam, it has been deemed advisable to provide a special mounting for the cam. The specific cam mounting structure is clearly illustrated in FIGS. 8 through 12.

The cam assembly, which is generally identified by the numeral 84, is carried by the spokes 18, 20 (FIGS. 1 and 8) and includes a pair of mounting bars 85, 86 which are rigidly secured to the spokes 18, 20 as at 87. Each of the mounting bars 85, 86 is provided with a mounting block 88 and extending between the mounting bars 88 in a radial direction are spaced parallel guide members 90. The guide members 90 have slidably mounted thereon for movement in a radial direction a cam unit generally identified by the numeral 91. The cam unit 91 includes a mounting block 92 which, as is shown in FIG. 10, is of a split construction and has slidably passing therethrough the guide bars 90. When the cam block 92 is in an adjusted position, fasteners 93 are tightened down so as to clamp the cam block onto the guide bars 90.

Adjustment of the cam block 92 along the guide bars 90 is accomplished by means of a feed screw 94 which is mounted for rotation in the mounting blocks 88 and which is threadedly passed through the cam block 92. One end of the feed screw is provided with a fitting 95 to facilitate the rotation thereof so as to feed the cam block 92 along the cam bars 90 in a selected direction.

A cam 95 is slidably carried by the cam block 92 for limited movement in a radial direction. The cam 94, as is shown in FIG. 12, has a cam groove formed therein which faces axially inwardly of the frame 16. On the opposite face of the cam 95 there is a T-shaped member 97 (FIG. 10) which is seated in a groove in the cam block 92 and which is slidably retained in place by means of a pair of blocks 98 secured to the cam block 92.

Clamped between the T-shaped member 97 and the cam 95 is an elongated pin 100 which projects radially inwardly and outwardly of the cam 95. The pin 100 has mounted on opposite ends thereof blocks 101 which are mounted on the cam block 92 by means of elongated bolts 102. Carried by each bolt 102 is a washer 103 against which a coil spring 104 reacts. Each spring 104 reacts against the associated block 101 and clamps the same against the cam block 92. The blocks 101 thus resiliently hold the cam 95 in a centered position relative to the cam block 92.

From the foregoing, it will be seen that the cam 95 is resiliently mounted so as to absorb any shock of the cam follower 83 engaging the same. Further, in the event there should be any jam which resists the movement of the blocks 38, 48 towards the mold halves, the cam 95 can further move sufficiently to prevent damage to the linkage 70 and the mold components. However, the springs 104 are of sufficient strength to normally retain the cam 95 in a relatively centered position so as to effect the necessary operation of the linkage 70.

In order to make certain that the blocks 101 do not rotate or jam, suitable guide bars 105 are secured to the cam 95 by means of fasteners 106. The guide bars 105 engage the sides of the blocks 101 in the manner shown in FIGS. 10 and 11.

In the event there is excessive movement of the cam 95, such as would be caused by a jam at a particular mold, it is desirable to shut down the operation of the molding machine 15. To effect this, there is provided a pair of switches 107 which are mounted in side-by-side relation on the cam block 92. Secured to the opposite faces of the cam 95 is a pair of offset actuators 108, each actuator 108 being secured to the cam 95 by fasteners 110. Each switch 107 is provided with a plunger 111 which passes through its associated actuator 110 and which has adjustably mounted thereon stop members 112 to effect movement of the plunger 111 in response to movement of the cam 95.

Reference is now made to FIG. 14 wherein the general details of the neck finish of the molded and trimmed bottle 62 are found. As previously described, bottle 62 is provided with a neck finish 63 including a molded end surface 64. The interior of the neck finish 63 also has a generally molded surface 115 which results from the action of the knife halves cutting the warm plastic material and passing down into the neck of the bottle in a wiping action. This is a distinguishing feature of the bottle 62 and advantageously eliminates any sharp inner edge at the extreme end of the bottle neck.

Previously there has been described small projecting pins 37 in the neck cavity 36 of the outer mold half 26. It is to be understood that the mold halves 24, 26 are so constructed that when the mold half 26 moves radially outwardly relative to the inner mold half 24, the bottle blown in the mold moves outwardly of the inner mold half 24 with the outer mold half 26. Then when the outer mold half reaches a fully open position, generally at the 12 o'clock position, the bottle is ejected from the outer mold half 26. However, the neck end of the bottle is normally held in the mold cavity 35 by the pinched off tube material. The pinched off tube material being separate from the neck finish 63, the neck finish has a tendency to release from the mold half 26 and the bottle dropped out. The pins 37, however, project into the neck finish and retain the neck of the bottle within the neck cavity 36.

It is to be understood that the bottle 62 will be ejected from the mold cavity 35 by means of the ejector 61 and that the cut-off tube portion will be ejected from the block 48 by the ejector rod 60.

Although only a preferred embodiment of the invention has been specifically illustrated and described herein, it is to be understood that minor variations may be made in the mold construction and cam assembly without departing from the spirit and scope of the invention, as defined in the appended claims.

We claim:

1. A mold cavity having generally radially moveable means for blow molding a hollow member having a tubular end portion including a transverse shoulder, and axially moveable cutter means for trimming the hollow member at the transverse shoulder thereof while the hollow member is still in said mold.

2. The mold of claim 1 wherein said mold is of the type for receiving a length of extruded tubing for molding the same.

3. The mold of claim 1 wherein said mold is of the type for receiving a length of extruded tubing for molding the same, and said cutter means are of a split construction for receiving therein the tubing.

4. The mold of claim 1 wherein said mold is of the type for receiving a length of extruded tubing for molding the same, and pinch-off means at opposite ends of said cavity means for sealing the length of extruded tubing during blow forming of a hollow member.

5. The mold of claim 4 wherein said cutter means are disposed intermediate that portion of said cavity means which defines a hollow member transverse shoulder and the adjacent pinch-off means.

6. The mold of claim 5 wherein said cutter means are of a split construction for receiving therein said tubing.

7. The mold of claim 1 wherein said cutter means includes an annular knife, and means for moving said knife axially to sever the molded hollow member transverse shoulder along a circular line.

8. The mold of claim 1 wherein said cutter means are of a type operable while said mold is closed.

9. A mold having cavity means for blow molding a hollow member having a tubular end portion including a transverse shoulder, cutter means for trimming a hollow member at the transverse shoulder thereof while the hollow member is still in said mold said mold being of the type for receiving a length of extruded tubing for molding the same, and pinch-off means at opposite ends of said cavity means for sealing the length of extruded tubing during blow forming of a hollow member, said mold including mold halves defining said cavity means, separate support means mounted on said mold halves adjacent that portion of said cavity means which defines a hollow member transverse shoulder for movement axially thereof, one of said pinch-off means being carried by said separate support means, said cutter means being carried by said separate support means for axial movement therewith, and means for moving said separate support means towards said mold halves to operate said cutter means.

10. The mold of claim 9 wherein said separate support means are formed of two halves each carried by a respective mold half for opening and closing movement therewith.

11. The mold of claim 9 wherein said separate support means are formed of two halves each carried by a respective mold half for opening and closing movement therewith, and cutter means are formed in two halves each carried by a respective separate support means half for receiving therein the tubing.

12. The mold of claim 11 wherein said cutter means are in the form of a sleeve extending axially from said separate support and having an end portion projecting into between said mold halves, said cutter means forming a continuation of said cavity means.

13. The mold of claim 9 wherein said mold includes a blow needle, and said blow needle is carried by said separate support means.

14. The mold of claim 9 wherein separate knock-out means are carried by one of said mold halves and by said separate support means.

15. The mold of claim 9 wherein said means for moving said separate support means include linkage means between said mold halves and said separate support means.

16. The mold of claim 9 wherein said means for moving said separate support means include linkage means between said mold halves and said separate support means, said linkage being of the cam actuated force multiplying type.

17. The mold of claim 1 wherein said cavity means includes means for temporary interlocking engagement with a hollow member being molded to temporarily retain the hollow member within the cavity means after the actuation of said cutter means and the opening of said mold.

18. The mold of claim 1 wherein said cavity means is a configuration to define a neck finish on a hollow member being molded, and said cavity means includes minute projections engageable in interlocking relation with the neck finish to temporarily retain a hollow member within said mold.

19. A molding machine comprising a frame, a plurality of molds mounted within said frame for movement about a closed path, each mold including mold halves mounted for movement between open and closed positions, as they move along said closed path, an extruder for extruding a hollow tube for reception in said molds, each mold having pinch-off means for removing and sealing a tubing portion, each mold having radially moveable means for blow molding each sealed tubular portion, and axially moveable cutter means for severing from a hollow member molded within each mold an adjacent pinched-off tube portion and defining an entrance opening into the molded member while the molded member is still in the mold.

20. The molding machine of claim 19 wherein said cutter means is of the type operable while the respective mold is closed.

21. The molding machine of claim 19 wherein said cutter means are in the form of a separate cutter carried by each mold, and actuating means for actuating each cutter as it passes a predetermined point along said path.

22. The molding machine of claim 21 wherein said actuating means includes a cam, and mounting means resiliently mounting said cam for movement when actuation of said cutter is unduly resisted.

23. The molding machine of claim 22 wherein switch means are associated with said cam for stopping the operation of said molding machine when said cam movement is excessive.

24. The molding machine of claim 22 wherein said mounting means includes guide means carried by said frame, and means for adjustably positioning said cam along said guide means.

* * * * *